United States Patent
Grabowski

(10) Patent No.: US 8,652,315 B2
(45) Date of Patent: *Feb. 18, 2014

(54) ELECTRODEIONIZATION METHOD AND DEVICE WITH HYDRODYNAMIC FLOW SPLITTING

(71) Applicant: EMD Millipore Corporation, Billerica, MA (US)

(72) Inventor: Andrej Grabowski, Montigny le Bretonneux (FR)

(73) Assignee: EMD Millipore Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/653,667

(22) Filed: Oct. 17, 2012

(65) Prior Publication Data

US 2013/0081948 A1    Apr. 4, 2013

Related U.S. Application Data

(62) Division of application No. 12/647,654, filed on Dec. 28, 2009, now Pat. No. 8,313,630.

(30) Foreign Application Priority Data

Dec. 31, 2008  (EP) .................................... 08291263

(51) Int. Cl.
  *B01D 61/48*  (2006.01)
  *C02F 1/469*  (2006.01)
(52) U.S. Cl.
  USPC ........... 204/524; 204/525; 204/533; 204/534; 204/536; 204/537
(58) Field of Classification Search
  USPC ................. 204/524, 525, 533, 534, 536, 537
  See application file for complete search history.

(56) References Cited

U.S. PATENT DOCUMENTS

| | | | |
|---|---|---|---|
| 6,241,867 B1 * | 6/2001 | Mir | ................................ 204/632 |
| 8,313,630 B2 | 11/2012 | Grabowski | |
| 2003/0213695 A1 | 11/2003 | Yamanaka et al. | |
| 2006/0231403 A1 | 10/2006 | Riviello | |
| 2008/0308482 A1 | 12/2008 | Tajima et al. | |

FOREIGN PATENT DOCUMENTS

| | | |
|---|---|---|
| WO | 98/51621 A1 | 11/1998 |
| WO | 2006/062176 A1 | 6/2006 |
| WO | 2008/130579 A1 | 10/2008 |

OTHER PUBLICATIONS

European Search Report dated Apr. 16, 2009 in corresponding European patent application No. 08291263.5.

* cited by examiner

*Primary Examiner* — Arun S Phasge
(74) *Attorney, Agent, or Firm* — Nields, Lemack & Frame, LLC

(57) ABSTRACT

Method for the removal of ions and ionizable substances from a polar liquid (10) comprising at least one process wherein said polar liquid (10) is split into a first stream (F1) and a second stream (F2), Said first stream (F1) passing through an electrochemically regenerable ion-exchange material (2) located where an electric field between two electrodes (4, 5) is applied, said first stream (F1) flowing from one electrode (4) to the other electrode (5) so that the ions to be removed are migrating in the direction reverse to the first stream flow through said ion-exchange material (2), Said second stream (F2) rinsing said one electrode (4), and said material is regenerated by the ions which are formed at the other electrode (5).

Figure 1:
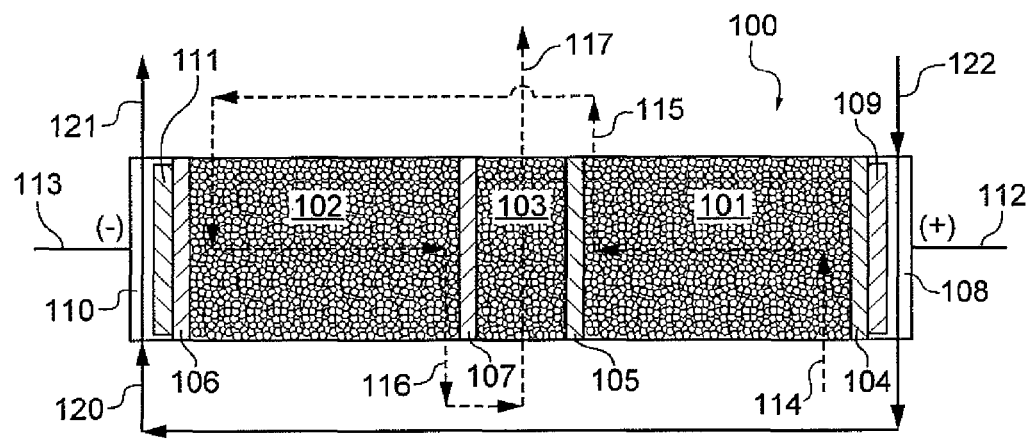

Device in particular for the implementation of said method.

6 Claims, 4 Drawing Sheets

Fig. 8

ELECTRODEIONIZATION METHOD AND DEVICE WITH HYDRODYNAMIC FLOW SPLITTING

This application is a divisional of U.S. patent application Ser. No. 12/647,654 filed Dec. 28, 2009, which claims priority of European Patent Application No. 08291263.5 filed Dec. 31, 2008, the disclosures of which are incorporated herein by reference.

The present invention pertains to a specialized electrodeionization (EDI) method and device. Such methods and devices are employed for the production of a deionized liquid from a liquid feed stream.

In this patent application "deionized" means "de-anionized", "de-cationized", or "completely deionized" (that is to say de-anionized and de-cationized).

Continuous electrodeionization, or just electrodeionization (EDI) is known in the art as a process which removes ionized and ionizable species from liquids, such as water, using electrically active media and an electric potential difference to influence ion transport. EDI relates currently to standard water deionization techniques. Its main principle, i.e. the use of a mixed bed ion-exchange resin in the diluate compartment of an electrodialysis stack was commercialized by Millipore Corporation in 1987.

In one of the first inventions concerning EDI, not only a mixed bed in the diluate compartment, but also layers of a cation-exchange resin and an anion-exchange resin aligned with flow direction and directed normally to the electric field (parallel to the ion-exchange membranes), or alternating layers or clusters aligned with electric field and directed normally to the flow are claimed. Such orientations were aimed to prevent reverse junctions, present in the mixed bed, and thus, improve deionization performance. The clusters or layers of ion-exchange resins provide a migration path for regenerating ions, keep the resins regenerated and able to remove ions from feed water. Compared to EDI with mixed bed, clustered or layered beds have decreased the electrical resistance of the diluate compartment and improved the deionization performance, especially regarding weakly dissociated electrolytes.

The use of cation-exchange resin and anion-exchange resin in completely separated diluate compartments, electrochemically regenerated in a continuous mode, is also known. In certain schemes, the feed aqueous solution flows through the cation-exchange resin and anion-exchange resin bed in series and the $H^+$ and $OH^-$ ions produced for example in the electrode reactions are used for regeneration of resins.

In known methods of EDI and related devices with electrochemical regeneration of ion-exchange material the liquid flow is fed in and streams out of every compartment separately or is distributed between the parallel compartments of a module through the common collector placed outside the compartments. Typical liquid used as feed is pre-treated water, such as reverse osmosis permeate.

In commercial EDI devices the general flow direction of the liquid is tangential to the surface of an ion-exchange membrane or an electrode. However some disclosures deal with devices where the general flow direction of the liquid is completely or partially normal to the surface of electrodes, such as in US patent applications US 2003/0213695 and US 2006/0231403.

Figure 6:
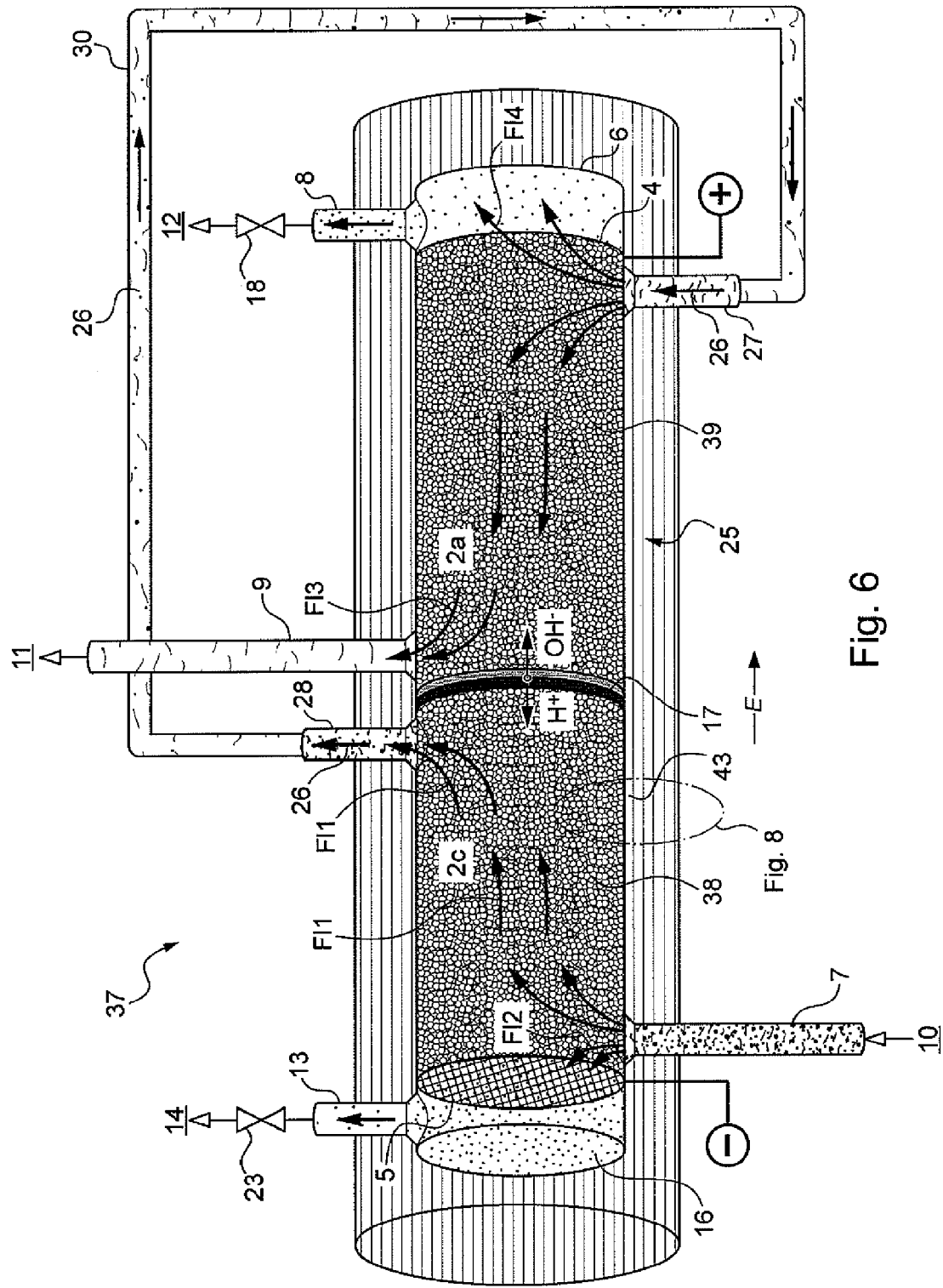

FIG. 1 is a schematic representation of a device 100 disclosed in the prior art, namely based on FIG. 6 of the US patent application 2006/0231403.

The device 100 is used for the removal of anions and cations from a water stream containing contaminant anions and cations. The device 100 consists of a housing comprising a cathode 111 and an anode 109. The cathode 111 is electrically connected to a (−) side 113 of a generator. The anode 109 is electrically connected to a (+) side 112 of a generator. An electric field is generated between the electrodes 111 and 109. The housing contains five compartments, which are: a cathode compartment 110, a cation depletion compartment 102, a central anion and cation depletion compartment 103, an anion depletion compartment 101 and an anode compartment 108.

Those compartments 110, 102, 103, 101 and 108 are partitioned inside the housing by two cation-exchange membranes 106 and 107, and two anion-exchange membranes 105 and 104. The cation-exchange membrane 106 closes the cathode compartment 110, and is near the cathode 111. The anion-exchange membrane 104 closes the anode compartment 108, and is near the anode 109. The central anion and cation depletion compartment 103 is partitioned by the cation-exchange membrane 107 on the cation depletion compartment 102 side and by the anion-exchange membrane 105 on the anion depletion compartment 101 side.

The cation depletion compartment 102 is homogeneously filled with a cation-exchange resin, which retains the cations of the liquid flow passing through it. The anion depletion compartment 101 is homogeneously filled with an anion-exchange resin which retains the anions of the liquid flow passing through it. The anion-exchange resin and the cation-exchange resin are continuously regenerated.

The central anion and cation depletion compartment 103 is heterogeneous, i.e. filled with a mixed bed of anion and cation-exchange resin. In this central compartment 103 the production of hydronium ions $H_3O^+$ (written further as $H^+$) and hydroxide ions $OH^-$ occurs. $OH^-$ migrates through the anion-exchange membrane 105 into the anion depletion compartment 101 in which it regenerates the anion-exchange resin by replacing the anions captured from the flow, which migrate towards the anode 109. $H^+$ migrates through the cation-exchange membrane 107 into the cation depletion compartment 102 in which it regenerates the cation-exchange resin by replacing the cations captured from the flow, which migrate towards the cathode 111.

An electrode rinse stream 122 enters the anode compartment 108, moves tangentially to the anode 109, and outflows in a stream 120 apparently on the same side as the inlet of stream 114. The stream 120 enters the cathode compartment 110, moves tangentially to the cathode 111, and outflows in an electrode rinse stream 121 apparently on the same side as the inlet of stream 115.

The housing has an inlet for the water stream 114 which enters in the anion depletion compartment 101 at a location close to the anion-exchange membrane 104. The water stream 101 flows countercurrently to the migration of the anions. The anion depleted water 115 outflows by an outlet situated close to the anion-exchange membrane 105, and further enters the cation depletion compartment 102 close to the cation-exchange membrane 106. This anion depleted water 115 flows countercurrently to the migration of the cations. Thus an anion and cation depleted water 116 outflows by an outlet situated close to the cation-exchange membrane 107. This anion and cation depleted water 116 flows through the anion and cation depletion compartment 103 tangentially to the ion-exchange membranes 105 and 107, and completely deionized product water 117 leaves the device 100.

A device with flow direction normal to the electrodes, i.e. directed countercurrently to the migration of counter-ions is claimed to have higher current efficiency and could result in better deionization performance advantageously to EDI devices with flow tangential to the ion-exchange membranes and normal to the electric field.

Generally the prior art disclosures of EDI devices with liquid flow directed normal to the surface of electrodes have the following "drawbacks", which may be mitigated:

Unit contains few compartments, each provided with own inlet and outlet, and at least two separate feeding streams, one for deionization and one for rinsing concentrate, e.g. electrode, compartments. Thus, the device 100 as described above is relatively complex because it requires four ion-exchange membranes defining five compartments within the device.

In the devices using the boundary between the ion-exchange membrane and the resin to provide electrochemically enhanced water dissociation the intensity of $H^+$ and $OH^-$ generation at a given potential difference is dependent on the properties of both materials and on the surface area of the contact between them, which can strongly vary with conditions.

In the mixed bed the reverse junctions between the beads reduces efficiency and ability of ion removal.

Therefore there is still a need for a simple, efficient and cost-effective EDI device. Accordingly and advantageously the present invention discloses methods and devices that may address one or more of the issues discussed above.

In addition to the method and device used for removal of anions or cations, a method and a device for complete deionization of a liquid are disclosed in the invention, which utilize electrochemically regenerated ion-exchange material and a bipolar membrane as source of $H^+$ and $OH^-$ ions, providing liquid flow directed counter-current to the electromigration of ions in the ion-exchange material. In the present invention a new flow distribution method is disclosed, wherein the liquid stream is split inside the compartment itself into a first stream used for the ions removal and a second concentrate stream used to rinse removed ions. The flow rates in the streams are preferably regulated by hydrodynamic adjustment of the pressure drops in the outgoing streams. The invention results in more simple construction of the device and in a material saving, i.e. no or fewer ion-exchange membranes required to separate compartments. These and other advantages are achieved in accordance with the present invention as described below.

The invention discloses a method for the removal of ions from a polar liquid comprising at least one process wherein:

Said polar liquid is split into a first stream and a second stream,

Said first stream passing through an electrochemically regenerable ion-exchange material located where an electric field is applied between two electrodes, said first stream flowing from one of the electrodes to the other of the electrodes so that the ions to be removed migrate in the direction reverse to the first stream flow through said ion-exchange material, Said second stream, rinsing said one of the electrodes or an ion-exchange membrane placed between the electrodes, and said material is regenerated by the ions which are formed at the other of the electrodes or at said ion-exchange membrane.

According to the invention, said first stream flowing from one of the electrodes to the other of the electrodes can be stopped by an ion-exchange membrane, for example a bipolar membrane, before reaching the other of the electrodes.

According to the invention, an ion-exchange membrane is generally an anion-exchange membrane or a cation-exchange membrane or a bipolar membrane. Preferably the ion-exchange membrane is a bipolar membrane.

"Bipolar membrane" is generally a synthetic non-porous ion-exchange membrane containing two oppositely charged ion-exchanging layers in contact with each other.

According to the invention, the rinsing of the one of the electrodes is compulsory and the rinsing of the other of the electrodes, or counter-electrode, is optional.

Preferably, the second stream rinses one of the electrodes by passing tangentially to said electrode and/or through said electrode, preferably through the electrode.

In a variant, a third stream rinses the other of the electrodes by passing tangentially to said electrode and/or through said electrode, preferably through the electrode.

According to a preferred implementation, at least one of the streams used to rinse one of the electrodes passes through a membrane before passing tangentially to and/or through said electrode. The membrane is preferably an ion-exchange membrane, which is generally non-porous. The membrane can also be a porous membrane.

There is an electric field applied between the electrodes. The electrodes can face each other.

The invention also comprises a method wherein:

two said processes are used for removing anions and cations, respectively by the means of an electrochemically regenerable anion-exchange material and an electrochemically regenerable cation-exchange material, and means for providing a source of regenerating $OH^-$ anions and $H^+$ cations, respectively for the anion-exchange material and for the cation-exchange material, are used.

Preferably, the two processes are carried out simultaneously, and more preferably the two processes are carried out simultaneously and within a unique device.

The method according to the invention can be such that the liquid flow is regulated by hydrodynamic adjustment of the pressure drops in at least one, preferably in all, outgoing streams.

The outgoing streams are the streams flowing in the outlets, and the entering streams are the streams flowing in the inlets.

The invention also discloses a device for the removal of ions from a polar liquid in which the device comprises at least one housing containing at least one compartment and in which an electrode and a counter-electrode are located at two different ends of the device, wherein an electrochemically regenerable ion-exchange material is placed between the electrode and the counter-electrode, the housing comprising one inlet for an entering liquid flow, said inlet being located at the electrode end of the device, and an outlet for a deionized liquid, said outlet being located at the counter-electrode end of the device or optionally at an ion-exchange membrane end of the device, said ion-exchange membrane being placed between the electrodes, and said ion-exchange membrane being preferably a bipolar membrane, the device being characterized in that it comprises means for splitting the entering liquid flow and in that there is at least a second outlet for a liquid used to rinse the electrode, said second outlet being located at the electrode end of the device.

The presence of an ion-exchange membrane is optional. The fact that, optionally, there is an electrochemically regenerable ion-exchange material placed between the electrode and the counter-electrode, does not necessarily mean that this material fills completely the space between the electrodes. This material generally fills a zone between the electrodes, for example a zone comprised between one of the electrodes and an ion-exchange membrane located between the electrodes. The zone can be this space volume or only a part of it.

According to the invention, the inlet and the second outlet located at the electrode end are close to each other in the zone formed by the electrode end. More preferable they are in front one of the other. This is advantageous in terms of hydrodynamic resistance.

Preferably, the device comprises a third outlet for a liquid used to rinse the counter-electrode or the ion-exchange membrane, if present, said third outlet being located at the counter-electrode end of the device or at the ion-exchange membrane end of the device.

In a variant, the device can be such that the housing comprises means for providing a source of $OH^-$ and $H^+$ ions defining two compartments inside the housing, each compartment being such that it comprises means for splitting the entering liquid flow, an outlet for a deionized liquid and an outlet for a liquid used to rinse the electrode or the counter-electrode or the ion-exchange membrane, if present, a piping connecting the inlet of one of the compartments with the outlet of the other of the compartments.

The hydrodynamic resistance of the device, corresponding to the difference between the entering and the outgoing liquid flows, is closely linked to the design of the device. According to the invention, the device preferably comprises means such as valves, capillaries, etc., situated downstream the outlets of the device for adjusting the hydrodynamic resistance of the entering and the outgoing liquid flows.

In a preferred embodiment according to the invention, the compartment being defined in the sense perpendicular to the electrodes by at least one wall in contact with the electrochemically regenerable ion-exchange material, the device according to the invention is characterized in that said wall is corrugated in at least one part, preferable all, of its surface facing said ion-exchange material.

According to the invention, "corrugated" means "marked with folds, grooves, ridges or furrows which are generally parallel, or marked with arrays". This can be realized according to different shapes, as known by the one skilled in the art.

In the case the electrochemically regenerable ion-exchange material consists of beads, particularly spherical beads, the best corrugated wall is a wall in which the beads perfectly fit.

By the packing of spherical beads in a compartment the bulk of closest packed beads, in the center of the compartment, can reach a maximal density pack of 0.74. If the wall is a plane, the packing density close to the wall of the compartment is below 0.52. At a distance of more than 10-20 bead diameter this effect can be considered as negligible. At a distance of only few bead diameter this effect is more pronounced. Due to this higher void volume the local flow velocity in the layer, which is close to the wall and has a thickness of below half the bead diameter, is higher than in the bulk. Such a non-equal distribution of the flow over the channel thickness leads to less efficient use of the chemically regenerable ion-exchange material. If the wall is a corrugated wall, this drawback is solved and the density of the packed beads in the neighborhood of the wall is advantageously improved.

According to the invention, the wall effect in the packed beds is advantageously eliminated if the wall exhibits certain corrugation, which equilibrates the packaging density of the beads in the middle of the channel and close to the wall. Such corrugations should have an height of ca. ½ of bead diameter and could have different shapes, like internal (female) threads, parallel notches, arrays of pyramidal protrudings, etc.

In the case the electrochemically regenerable ion-exchange material is fibrous or made of porous blocks, the corrugated wall will provide a good fixing of the material in the compartment and prevent flow channelling between the wall and the ion-exchange material.

Thus the device of the invention comprises of at least two electrodes: anode and cathode, an ion-conductive material is placed between electrodes and an ion conductive path is provided. If an external voltage difference is applied between the electrodes, reactions take place at their surfaces and the electromigration of ions occurs in an electric field between the electrodes, conducting the electric current. The device of the invention comprises at least one compartment located between electrodes, which is the deionization compartment and which contains an ion-exchange material. The ion-exchange material is generally an ion-exchange flow-through medium, for example an ion-exchange resin bed. Mobile ions present in majority inside the ion-exchange material are counter-ions, which are cations for a cation-exchange material and anions for an anion-exchange material. These ions are responsible for the conduction of current inside the ion-exchange material, whereas cations inside cation-exchange material move in the direction from anode to cathode, while anions inside anion-exchange material move in the direction from cathode to anode.

The flow of liquid used for ions removal is directed opposite, i.e. counter-current, to the migration of ions inside the ion-exchange material. The corresponding ions from the feed stream will be removed by ion-exchange, will further migrate inside ion-exchange material and will finally be released at the electrode to a concentrate stream going to waste.

Considering counter-ions migration and an electric field directed normally to the electrode plane, the angle between the flow and counter-ions migration is around 180° for the flow directed fully counter-current to counter-ions migration inside the ion-exchange material. Depending on the design of the device, certain deviations from this angle are allowed and the angle can be 180°±80° for the flow described herein as counter-current to ion migration inside the ion-exchange material.

The ion-exchange material is generally continuously regenerated electrochemically. Thus, the ions from the feed stream can be continuously exchanged and the aqueous solution free of corresponding salt ions is obtained.

According to the invention, a device containing anion-exchange material, as described above, can be used for efficient removal of salt anions present in the feed stream. It is also able to remove weakly dissociated acids present in the form of non-dissociated molecules, such as carbonic acid (or $CO_2$), silicic acid, boric acid, etc.

According to the invention, a device filled with cation-exchange material, as described above, can be used for efficient removal of salt cations present in the feed stream. It is also able to remove bases present in the form of non-dissociated molecule, such as $NH_4OH$ (or $NH_3$), amines, etc.

The device described below can be used for the removal of acids or bases from a polar liquid, or for the production of bases or acids from its aqueous salt solution, exchanging corresponding ions by $OH^-$ or $H^+$ ions.

The regenerable ion-exchange material is usually a bed of an ion-exchange resin. More generally, conventional ion-exchange material are resin beads, high mesh beads of ion-exchange resin, powdered resin, as well as fibrous or porous ion-exchangers. They can be stacked as beds or blocks.

According to the invention, an electrode compartment is a compartment, different from the deionization compartment, in which an electrode is present. An electrode compartment can comprise conductive flow-through material, such as metal or carbon in form of porous blocks or a bed of beads. It can also comprise no filler or can be filled with flow-through material, having neutral, cation-exchange, anion-exchange or electron-conductive properties, such as carbon beads.

In accordance with the present invention the device contains from one to five compartments, preferably from one to three compartments.

For the removal of both cations and anions, i.e. for complete deionization, a solution is the use of two devices in series, one filled with cation-exchange material and the other filled with anion-exchange material. In this case, a preferable sequence of devices in series must be defined considering the type of contaminations. For typical contaminants of natural or treated (for example by reverse osmosis) natural waters, the cation-exchange material—anion-exchange material sequence is usually advantageous, but is not limited thereto. If wished, both devices could be integrated inside one housing, without being outside the scope of the invention.

Another solution, advantageously used for complete deionization according to the invention, lies in the use of a device with liquid flow directed counter-current to the electromigration of ions inside the ion-exchange material, wherein a bipolar electrode or an ion-exchange membrane, preferably a bipolar membrane, is utilized for the formation of regenerating $H^+$ and $OH^-$ ions. The use of a bipolar membrane is advantageous, in a case where the polar liquid is an aqueous solution, because it results only in electrochemically enhanced water dissociation into $H^+$ and $OH^-$ ions without formation of gases and other by-products as it occurs with electrodes.

According to the invention, electrode rinsing is preferably provided similar to that for the methods described in previous embodiments of the invention. The rinsing of electrodes can be organized by any method described below, i.e. using hydrodynamic feed flow splitting inside the compartments without any, or with, a membrane separating an electrode compartment.

The hydrodynamic flow splitting and if needed the electrode rinsing can be organized with different variants of the devices and methods as disclosed in the Figures, as it will be obvious for the one skilled in the art. Thus, the device of the present invention used for removal of ions has a housing in which a main stream flows through the electrochemically regenerated ion-exchange material directed counter-current to electromigration of ions inside this material, whereas the rinsing of at least one electrode (cathode or/and anode) can be managed by any method described below, i.e. using hydrodynamic flow splitting inside a compartment without any membrane, with membrane, or using a separately feed electrode compartment.

Figure 2:
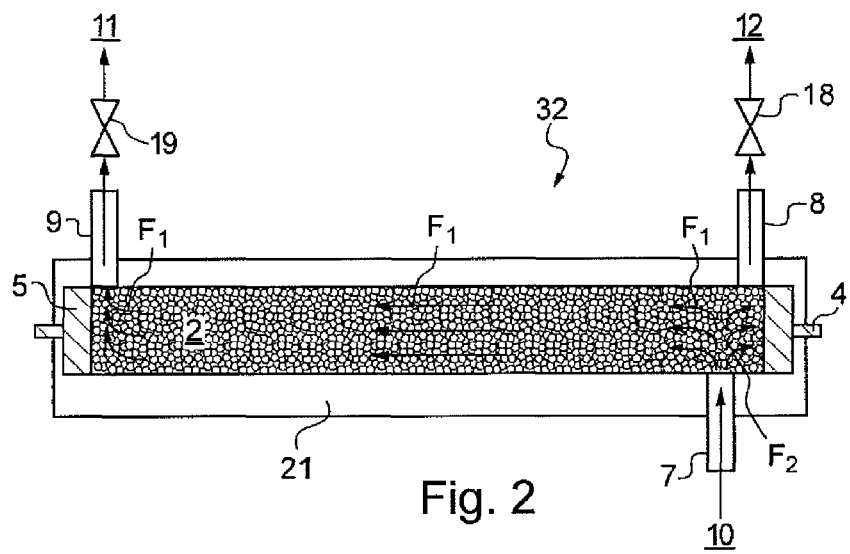
Figure 3:
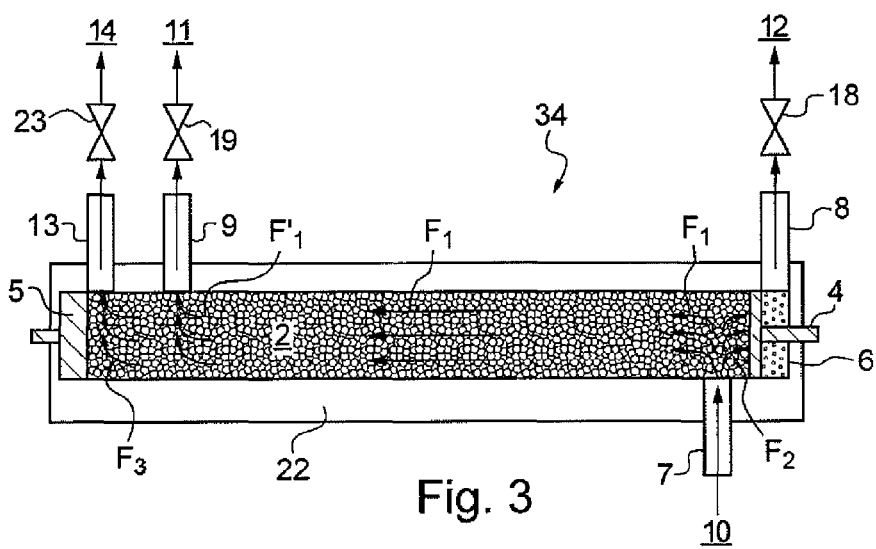
Figure 4:
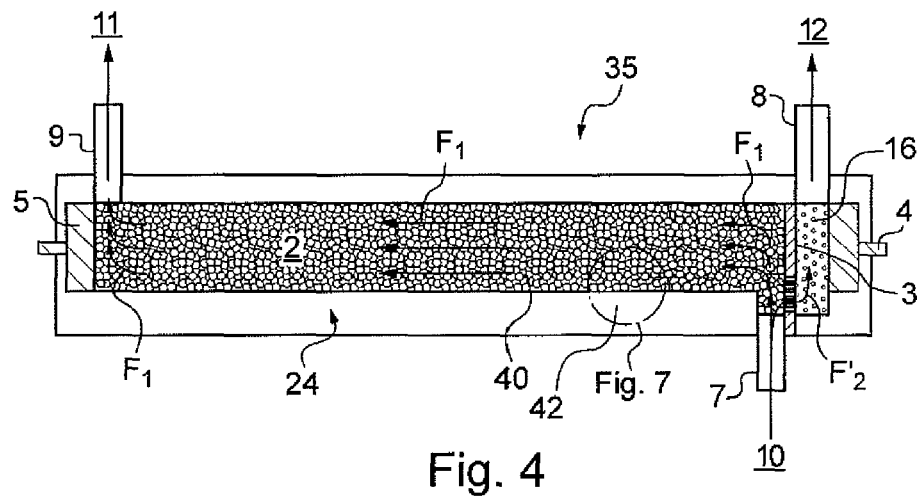
Figure 5:
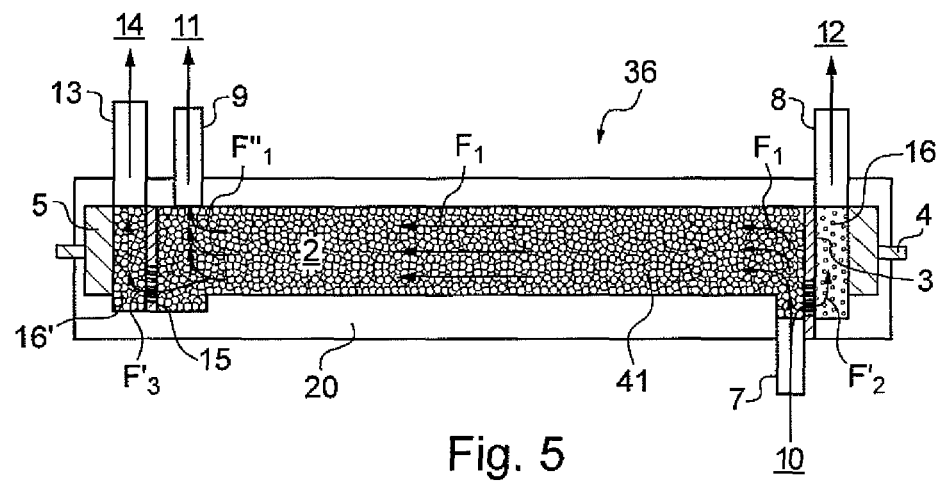
Figure 7:
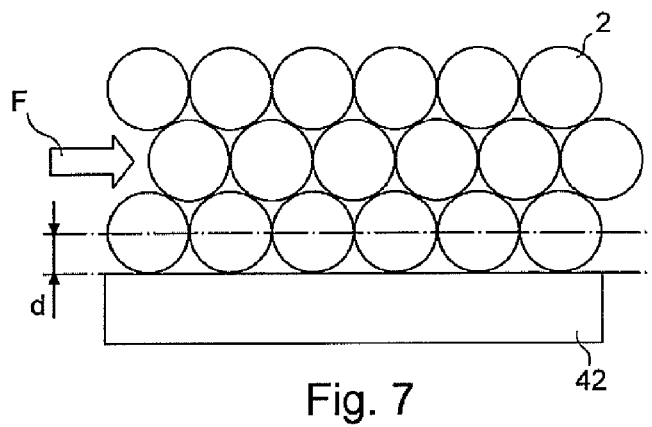
Figure 9:
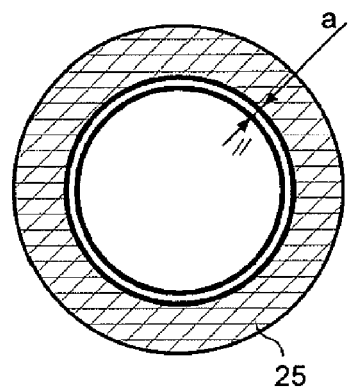
Figure 8:
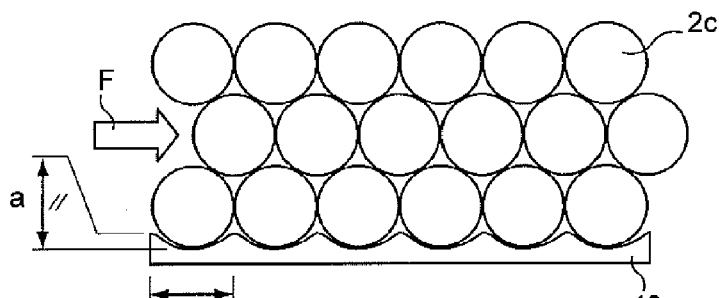
Figure 10A:
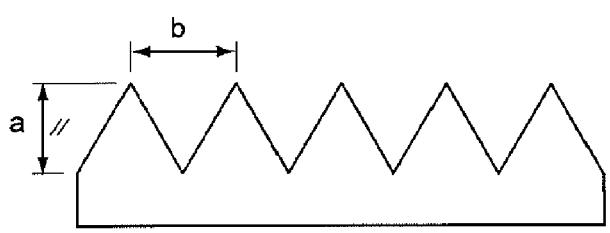
Figure 10B:
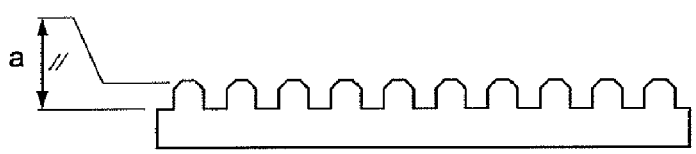

The techniques of the present invention will be readily understood by considering the following detailed description in conjunction with the accompanying drawings, in the case of an aqueous solution to be deionized, in which:

FIG. 1 is a schematic representation of a typical prior art deionization device;

FIG. 2 is a schematic representation of a first implementation of a deionization device according to the invention, FIG. 3 is a schematic representation of a second implementation of a deionization device according to the invention, FIG. 4 is a schematic representation of a third implementation of a deionization device according to the invention, FIG. 5 is a schematic representation of a fourth implementation of a deionization device according to the invention, FIG. 6 is a schematic representation of a fifth implementation of a deionization device according to the invention, FIG. 7 is a schematic representation of a part of the device of FIG. 4, FIG. 8 is a schematic representation of a part of the device of FIG. 6, FIG. 9 is a schematic representation of a detail of the device of FIG. 6, and FIGS. 10A and 10B are schematic representations of the variants of the device of FIG. 6.

To facilitate understanding, identical reference numerals have been used, when possible, to designate identical elements that are common to the Figures. The drawings are not to scale and the relative dimensions of various elements in the drawings are depicted schematically and not to scale. The electrochemically regenerable ion-exchange material always consists of beads of substantially the same diameter.

FIG. 1, which is a schematic representation of a typical prior art deionization device, has been described above.

FIG. 2 is a schematic representation of a first implementation of a deionization device 32 according to the invention.

The device 32 can be used for the removal of anions or for the removal of cations. It will be described here as a device 32 used to remove anions from water, e.g. to replace salt anions by $OH^-$ and/or remove acids present in dissociated or non-dissociated form.

The device 32 comprises a housing 21, for example of cylindrical or other shape, containing inside: an anode 4, a cathode 5 and an anion-exchange material 2 between the electrodes. The housing 21 defines one compartment and forms an electrochemical cell. The housing 21 has an inlet 7 for aqueous feed solution flow 10, an outlet 8 for anode rinse stream 12 and an outlet 9 for the product stream free of salt anions 11.

The feed 10 enters the cell through the inlet 7 located close to the anode 4 end. The inlet 7 and the anode 4 are located at one end, which is the anode end, of the housing 21. The housing 21 has another end, which is the cathode 5 end, located at the opposite end to the anode end. When there are two outlets 8 and 9, the flow 10 will be split into a first stream used for the ions removal (F1 arrows) and a second stream to rinse the anode (F2 arrows). The stream F1 for ions removal turns in the direction normal to electrodes 4 and 5 and flows from the anode 4 to the cathode 5 (from right to left in FIG. 2).

An electric voltage difference is applied between the electrodes 4 and 5 and thus an electric current is conducted through the cell formed by the housing 21. The electrochemical reaction of water splitting takes place at the cathode 5 generating $H_2$ and $OH^-$. $OH^-$ ions migrate inside the anion-exchange material 2 in the direction from the cathode 5 to the anode 4, i.e. counter-current to the flow F1. An exchange between salt anions of the flow F1 and $OH^-$ of the anion-exchange material 2 occurs. Thus, the anion-exchange material close to the anode 4 end is present mostly in salt form, while the anion-exchange material close to the cathode 5 end is present mostly in regenerated $OH^-$ form. Treated stream 11, substantially free of salt anions, leaves the housing 21 from the outlet 9, whose hydrodynamic resistance is regulated by a valve 19. The outlet 9 is located at the cathode end, close to the cathode 5.

The removed anions, as well as the $H^+$ anions and $O_2$ gas produced at the anode 4, are rinsed by the anode rinse stream and leave the housing 21 through the outlet 8, whose hydrodynamic resistance is regulated by a valve 18, as anode waste 12.

The ratio of flows for product 11 and waste 12 defines the recovery of the device. Advantageously according to the invention, it can be adjusted by hydrodynamic resistances of both paths, which depend on the device and can be additionally regulated by valves, capillaries, etc., downstream of one or more outlets of the device. In the embodiment shown in FIG. 2, the regulation is mainly carried out by the valves 19 and 18 respectively placed on outlets 9 and 8.

As mentioned above, the same principal could be used for removal of cations. In this case some numbers in FIG. 2 would have a different meaning, thus (2) would stand for a cation-exchange material, and the polarity would be reversed, e.g. (5) would stand for an anode and (4) for a cathode. The device would be used to remove cations from the aqueous solution, e.g. to replace salt cations by $H^+$ and/or remove bases present in dissociated or non-dissociated form. The removed cations, as well as the $OH^-$ cations and $H_2$ gas produced at the cathode, will be rinsed by the cathode rinse stream (12).

FIG. 3 is a schematic representation of a third implementation of a deionization device 34 according to the invention. The device 34 can be used for the removal of anions or for the removal of cations. It will be described here as a device 34 used to remove anions from an aqueous solution.

The device 34 comprises a housing 22, which might be a cylinder or another shape, containing an anode 4, a cathode 5 and an anion-exchange material 2 between the electrodes. The housing 22 defines one compartment and forms an electrochemical cell. The housing 22 has an inlet 7 for aqueous feed solution flow 10, an outlet 8 for anode rinse stream 12, an outlet 13 for cathode rinse stream 14 and an outlet 9 for the product stream substantially free of salt anions 11.

The feed 10 enters the cell through the inlet 7 located close to the anode 4 end. The inlet 7 and the anode 4 are located at one end, which is the anode end, of the housing 21. The housing 21 has another end, which is the cathode end, located at the opposite end to the anode end. The outlets 9 and 13 are located at the cathode 5 end, close to the cathode 5, the outlet 13 being closer thereto than the outlet 9. When there are three outlets 8, 13 and 9, the flow 10 will be split into the first stream used for the ions removal (arrows F1) and the second stream to rinse the anode 4 (arrows F2). The stream F1 for ions removal turns in the direction normal to electrodes 4 and 5 and flows from the anode 4 to the cathode 5, where it is further split into the product stream substantially free of salt anions 11 (arrows F'1) and a third stream, a cathode rinse stream 14 (arrows F3).

Thus a separate outlet 13 for the cathode rinse stream 14 is provided and the cathode 5 is rinsed using hydrodynamic split flow. This cathode rinse stream 14 will advantageously contain gas(es) (such as $H_2$ produced at the cathode 5) and possible by-products of electrode reactions, so the product stream 11 will be substantially pure. According to the invention, the liquid stream used for the ions removal is directed counter-current to the electromigration of ions inside ion-exchange material 2, whereas a part of the treated liquid leaves the housing 22 through the outlet 9 as a product 11, while another part is used to rinse the cathode 5 and leaves the compartment through the outlet 13 as waste 14.

In this case, the aqueous solution hydrodynamic splitting inside the housing 22 takes place twice: first, close to the inlet 7, and second, close to the outlet 9 of the housing 22, in the direction of the main liquid flow (arrows F1). As in the previous illustrated embodiment, the ratio between the flow rates through the outlets 8, 9 and 13 is defined by hydrodynamic resistances of three paths, which depend on the design of the device 34 and can be regulated by valves, capillaries, etc., downstream of the outlets of the device 34.

In the implementation of FIG. 3, the liquid can flow through electrode 4 and the outlet 8 for electrode rinsing 12 is provided in the compartment 6 behind the electrode 4. Thus the second stream for electrode rinsing (arrows F2) passes through the electrode 4 and leaves the cell 21 through the outlet 8 as waste 12, together with removed ions and products of electrode reactions.

In this case, the electrode can be of a metal in mesh form or can be a porous material, metallic or not. It can also be a composite electrode, made of different materials or structures. The compartment 6 can be filled with conductive flow-through material. This could increase the effective electrode surface and decrease the local changes of ion concentration, pH, as well as formation of large gas bubbles at the surface of the electrodes. In some cases it could be efficient to prevent the formation of scaling. If the electrode 4 is a cathode, this is particularly advantageous to reduce the scaling risk linked with local pH increase of the cathode 4 surface, when an aqueous solution containing hardness ions is used.

FIG. 4 is a schematic representation of a third implementation of a deionization device 35 according to the invention. The device 35 can be used for the removal of anions or for the removal of cations. It will be described here as a device 35 used to remove anions from an aqueous solution.

The device 35 comprises a housing 24 which forms an electrochemical cell. The housing 24 has an inlet 7 for the feed stream 10, an outlet 8 for the electrode rinse stream 12, an outlet 9 for the product stream substantially free of salt anions 11, an anode 4, a cathode 5 and an anion-exchange material 2 between the electrodes. The liquid flow (arrow F1) in the housing 24 for ion removal is directed counter-current to the migration of counter-ions inside the ion-exchange material 2.

The housing is defined in the sense perpendicular to the electrodes 4 and 5 by one wall 42 which is a plane closed so that to form a cylinder. The wall 42 is in contact with the electrochemically regenerable ion-exchange material 2c. Part of said wall 42 is shown in detail in FIG. 7. The flow of liquid is represented by the arrow F. d is the radius of a bead of the material 2. The length of d is the thickness of a wall layer in which there are more voids than in the bulk of said material 2.

The device 35 is generally similar to the device 32 illustrated in FIG. 2, except for the fact that here a membrane 3, which is preferably an ion-exchange membrane, separates the housing 24 into a purification compartment 16 and a main deionization compartment 40. A part of the feed stream 10 (arrows F'2) is used to rinse the anode compartment 16, using for example the holes (or pores) in the housing and/or in the lower part of the membrane 3, as shown schematically in FIG. 4. This membrane 3 separates the housing 24 into two compartments 16 and 40, which advantageously leads to a better hydrodynamic separation.

Here in the case of device for anion removal, the membrane 3 is preferably an anion-exchange membrane. In the case of cation removal the membrane 3 would be preferably a cation-exchange membrane.

The electrode compartment 16 can have no filler (as illustrated) or can be filled with a flow-through conductive material.

If the presence of gases and other by-products of reactions at the cathode 5 in the product stream 11 is undesired, a separate outlet for the cathode 5 rinse can be provided using hydrodynamic flow splitting as shown in FIG. 5.

FIG. 5 is a schematic representation of a fourth implementation of a deionization device 36 according to the invention. The device 36 can be used for the removal of anions or for the removal of cations. It will be described here as a device 36 used to remove anions from an aqueous solution.

The device 36 comprises a housing 20 which has an inlet 7 for the feed stream 10, an outlet 9 for the product stream 11 substantially free of salt anions, a cathode 5, an outlet 13 for the cathode rinse stream 14, an anion-exchange material 2 between membranes 3 and 15, an anode 4, an outlet 8 for the anode rinse stream 12, and an anode compartment 16 separated by a membrane 3. The liquid flow (arrows F1) in the housing 20 for ions removal is directed counter-current to the migration of counter-ions inside the ion-exchange material 2.

The device 36 is generally similar to the device 35 illustrated in FIG. 4, except that a membrane 15, which is preferably an ion-exchange membrane, partitions a cathode compartment 16'. A part of the deionized feed stream is used to rinse the electrode compartment 16', using for example the holes (or pores) in the housing and/or in the lower part of the membrane 15, as shown schematically in FIG. 5. This membrane 15 further separates the device 36 into the compartment 16' and a main deionization compartment 41 (instead of the main deionization compartment 40 in FIG. 4) and that advantageously leads to a better hydrodynamic separation. The housing 20 comprises three compartments: the cathode compartment 16', the anode compartment 16, and the main deionization compartment 41 between them.

Here in the case of a device for anion removal, the membrane 15 is preferably an anion-exchange membrane. In the case of cation removal, (4) would stand for the cathode, (5) for the anode and (15) would be preferably a cation-exchange membrane.

The electrode compartment 16' can have no filler or can be filled with material, having neutral, cation-exchange, anion-exchange (as illustrated) or electron-conductive properties.

Preferably the cathode compartment 16' is filled with an electron-conductive flow-through material and the anode compartment 16 is filled with an anion-exchange flow-through material.

In this case the feed stream 10 entering the housing 20 through the inlet 7 is first split into a first stream used for ions removal (arrows F1) and a second stream for electrode rinse (arrows F'2), which passes through the membrane 3 and leaves the cell 20 through the outlet 8 as waste 12, together with removed ions and products of electrode reactions. The first stream, after having passed through the ion-exchange material 2, is split into a stream (arrows F"1) which leaves the cell 20 through the outlet 9 as a substantially deionized product 11, and a third stream (arrows F'3), which passes through the membrane 15 and leaves the cell 20 through the outlet 13 as waste 14, together with products of electrode reactions.

In the implementations shown in FIGS. 4 and 5, we have demonstrated that it is possible to use electrode compartment(s) (16, 16') isolated from the deionization compartment (40, 41) filled with the ion-exchange material 2, whereas the flow (arrows F1) through this compartment is directed counter-current to ions migration inside the ion-exchange material 2.

FIG. 6 is a schematic representation of a fifth implementation of a deionization device 37 according to the invention.

The device 37 comprises a housing 25, of cylindrical shape, containing inside: an anode 4, a cathode 5, a bipolar membrane 17, an anion-exchange material 2a in a deionization compartment 39 located between the anode 4 and the bipolar membrane 17, and a cation-exchange material 2c in a deionization compartment 38 located between the bipolar membrane 17 and the cathode 5.

The housing 25 forms an electrochemical cell. The housing 25 is defined in the sense perpendicular to the electrodes 4 and 5 by one wall 43 which is a plane closed so that to form a cylinder. The wall 43 is corrugated, as shown in FIG. 9. The depth of the corrugations is of dimension a.

The wall 43 is in contact with the electrochemically regenerable ion-exchange materials 2a and 2c. Part of said wall 43, in contact with the electrochemically regenerable anion-exchange material 2a, is shown in detail in FIG. 8 where the flow of liquid is represented b the arrow F. The beads of the material 2c fits perfectly with the corrugations. Each section of corrugation has the shape of a wave, whose depth is of dimension a and whose length is of dimension b, as shown in FIG. 8.

Other variants of corrugations are shown in FIG. 10, comprising corrugations having triangular sections (FIG. 10A), and corrugations having more or less hemispherical section (FIG. 10B).

The housing 25 has an outlet 13 for cathode rinse stream 14, an outlet 8 for anode rinse stream 12, an inlet 7 for aqueous feed solution flow 10 flowing into the cation-exchange material 2c, an outlet 28 for the stream 26 substantially free of salt cations, the stream 26 flowing via a pipe 30 to an inlet 27, and flowing further into the anion-exchange material 2a, as well as to an outlet 9 for the product stream 11 substantially free of salt cations and anions. The bipolar membrane 17 comprises at least two layers: an anode-facing anion-exchange layer and a cathode-facing cation-exchange layer, and is able to generate $OH^-$ anions and $H^+$ cations from water dissociation.

The feed 10 enters the cell through the inlet 7 located close to the cathode 5. When there are two outlets 13 and 28, the flow 10 will be split into the stream used for the removal of ions (arrows FI1) and the stream to rinse the cathode (arrows FI2). The stream FI1 used for the removal of ions turns in the direction normal to electrodes 4 and 5 and flows from the cathode 5 to the anode 4 (from left to right in FIG. 6), is hydrodynamically restricted by the bipolar membrane 17 and outflows by the outlet 28.

The feed 26 enters the cell through the inlet 27 located close to the anode 4 end. When there are two outlets 8 and 9, the flow 26 will be split into the stream used for the removal of ions (arrows FI3) and the stream to rinse the anode (arrows FI4). The stream FI3 used for the removal of ions turns in the direction normal to electrodes 4 and 5 and flows from the anode 4 end to the cathode 5 end (from right to left in FIG. 7), is hydrodynamically restricted by the bipolar membrane 17 and outflows by the outlet 9.

This device 37 for deionization uses a cation-exchange material 2c and an anion-exchange material 2a separated by the bipolar membrane 17 for electrochemically enhanced water dissociation, whereas flow (FI1, FI3) is directed counter-current to the electromigration of ions inside said materials, where the hydrodynamic flow splitting inside deionization compartments 39 and 38 is used to rinse the flow-through electrodes, the space 6 or 16 behind the electrode 4 or 5 being filled with electron conductive material (not illustrated).

According to the invention, the flow 12 through the outlet 8 is regulated by a valve 18, and the flow 14 through the outlet 13 is regulated by a valve 23.

The device for deionization is not limited to the sequence of flow present in FIG. 6, where the feed flow streams first through the compartment 38 with cation-exchange material 2c and then through the compartment 39 filled with anion-exchange material 2a. Another sequence is also possible, where the feed flow passes first through the compartment 39 with anion-exchange material 2a and then through the compartment 38 with cation-exchange material 2c, using following sequence of inlets and outlets in FIG. 6: 27-9-7-28, the pipe 30 being located between the outlet 9 and the inlet 7.

Another implementation (not illustrated) comprises at least one, preferable both, electrode compartment(s) separated from a deionization compartment by a fluid-tight ion-exchange membrane and having its own inlet and optionally its own outlet for separated rinsing stream.

According to the invention, this embodiment does not preclude the rinsing by the second stream. Thus in this case the electrode is rinsed twice by its two sides: the electrode compartment side and the deionization compartment side.

In such a case a dense (without holes or pores) ion-exchange membrane is used to separate an electrode compartment from the deionization compartment. A part of the product or feed stream, the rinse of other electrode compartment, as well as other liquid(s), can be used to rinse such separated electrode compartment.

If desired, the space close to the bipolar membrane can also be rinsed separately, using the same principles of hydrodynamic flow splitting inside a compartment without any ion-exchange membrane, with ion-exchange membrane, or using a separately fed compartment. For example the bipolar membrane 17 could have a limited permselectivity and thus allow some contaminations to migrate and/or diffuse from the compartment filled with 2c into the compartment filled with 2a. In this case some of these contaminations could appear in the product 11. To prevent this, the space adjacent to the bipolar membrane in the compartment filled with 2a can be rinsed using hydrodynamic flow splitting without or with an ion-exchange membrane, or using an additional compartment completely separated by an ion-exchange membrane. If a separate compartment adjacent to the bipolar membrane is used, it should be filled with an anion-exchange material adjacent to the anion-exchange layer of bipolar membrane or by a cation-exchange material adjacent to the cation-exchange layer of bipolar membrane. Thus the invention encompasses also the use of ion-exchange membranes for separation of an electrode compartment or a compartment close to the bipolar membrane.

According to the invention, aqueous solution stream between the $1^{st}$ and the $2^{nd}$ deionization compartment, aqueous product solution, as well as another liquid stream, can also be utilized in part or as a whole for the rinsing of separated electrode compartments, or compartments adjacent to the bipolar membrane with an external inlet and an external outlet.

A preferable sequence for the flow through the deionization compartments in series must be defined considering the type of contaminations. For typical contaminants of natural or treated (for example by reverse osmosis) natural water, the sequence of liquid flowing first through the compartment filled with cation-exchange material and then flowing through the compartment filled with anion-exchange material is usually advantageous, but is not limited thereto.

The methods and devices of the invention are advantageous in term of high current efficiency, high buffering capacity, excellent deionization performance, simple construction and low material cost. They should be most applicable, but not limited, to devices of small scale dimensions and flow rates preferably of 0-50 L/h, or more preferably 0.05-5 L/h.

The devices of the invention differ generally from traditional plate-and-frame or spiral wound module design. That gives additional features, such as the possibility to create an original 3D design for a device. The general design is not limited to plane electrodes placed parallel to each other and to rectilinear compartment(s) between the electrodes, to provide the liquid flow directed counter-current to the electromigration of ions.

Typical liquid used as feed is pre-treated water, such as permeate of reverse osmosis, nanofiltration or ultrafiltration.

The principle of the methods and devices of the present invention used to remove ionic or/and ionizable components from a polar liquid can be applied not only to aqueous electrolyte solutions, but also to solutions in other polar solvents or in the water/polar solvent mixtures.

In the case of water/polar solvent mixtures the principle of the ionic transport is similar to that of aqueous solutions, i.e. the electrochemical water splitting takes place at the electrodes or in the bipolar membrane, generating $H^+$ and $OH^-$ used for electrochemical regeneration of an ion-exchange material and for exchange with ions from liquid.

It is known that electrochemical splitting of some polar solvents is possible at electrodes or in a bipolar membrane. In a bipolar membrane some organic acids may be split by an electric field into $H^+$ and carboxylate ions, some of alcohols may be split into $H^+$ and lyate ions, etc. For example, the splitting of methanol inside a bipolar membrane generates $H^+$ and $CH_3O^-$ (methoxide) ions. Generated ions can migrate into an ion-exchange material and can be used for the ion-exchange with ions to be removed from the liquid stream. Nevertheless, to simplify the explanations, the illustrations used in the present description are based on the use of aqueous solutions, i.e. water with ionic or ionizable contaminants, with $H^+$ or/and $OH^-$ ions as products of electrochemical water splitting being used for electrochemical regeneration of ion-exchange material.

The invention claimed is:

1. A method for removing ions from a polar liquid, comprising:
    providing a device comprising at least one housing containing at least one compartment and in which an electrode and a counter-electrode are located at two different ends of the device, and containing an ion-exchange membrane, wherein an electrochemically regenerable ion-exchange material is placed between the electrode and the counter-electrode, the housing comprising one inlet for an entering liquid flow, said inlet being located at the electrode end of the device, and an outlet for a deionized liquid, said outlet being located at the counter-electrode end of the device or at an ion-exchange membrane end of the device, said ion-exchange membrane being a bipolar membrane and being placed between the electrodes, wherein the device comprises valves for splitting the entering liquid flow and at least a second outlet for a liquid used to rinse the electrode, said second outlet being located at the electrode end of the device;
    splitting said polar liquid into first and second streams;
    flowing said first stream through said electrochemically regenerable ion-exchange material, causing ions to migrate in the direction reverse to the flow of said first stream through said electrochemically regenerable ion-exchange material; and
    rinsing one of said electrodes or said ion-exchange material with said second stream.

2. The method of claim 1, further comprising regenerating said ion-exchange material with the ions formed at said counter-electrode or said ion-exchange membrane.

3. The method of claim 1, wherein said second stream rinses one of said electrodes by passing tangentially to said electrode or through said electrode.

4. The method of claim 1, further comprising regulating the flow of said first stream out of said outlet by adjusting the hydrodynamic pressure drop in said first stream.

5. The method of claim 1, further comprising regulating the flow of said second stream out of said second outlet by adjusting the hydrodynamic pressure in said second stream.

6. The method of claim 1, further comprising providing a third outlet for a liquid used to rinse the counter-electrode or the ion-exchange membrane, said third outlet being located at the counter-electrode end of the device or at the ion-exchange membrane end of the device.

* * * * *